Jan. 14, 1936.  W. M. AUSTIN  2,027,623
FRICTION SHOCK ABSORBING MECHANISM
Filed Nov. 5, 1932  2 Sheets-Sheet 1
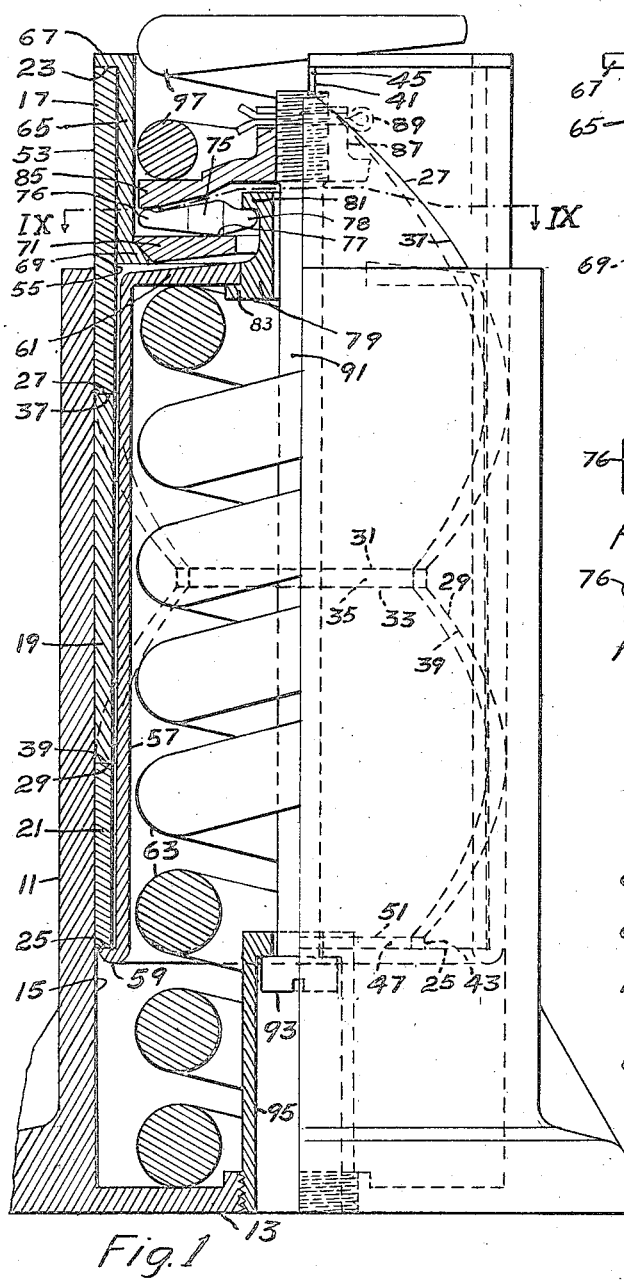
Fig. 1
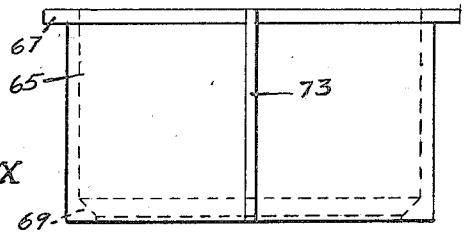
Fig. 2
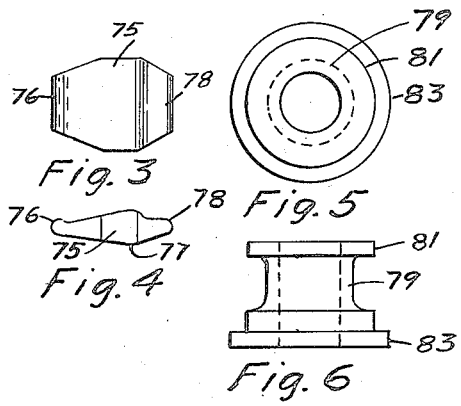
Fig. 3
Fig. 4
Fig. 5
Fig. 6
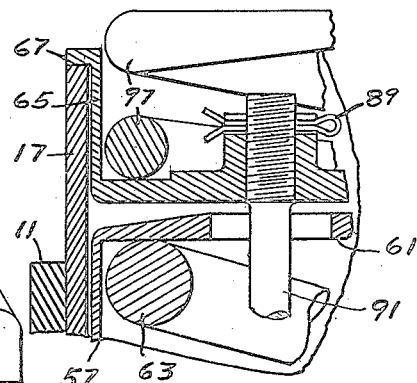
Fig. 7
INVENTOR
WALTER M. AUSTIN
BY
Ralph N. Swingle
ATTORNEY Jan. 14, 1936.   W. M. AUSTIN   2,027,623
FRICTION SHOCK ABSORBING MECHANISM
Filed Nov. 5, 1932   2 Sheets-Sheet 2

INVENTOR
WALTER M. AUSTIN
BY
Ralph H. Swingle
ATTORNEY

Patented Jan. 14, 1936

2,027,623

UNITED STATES PATENT OFFICE 2,027,623

FRICTION SHOCK ABSORBING MECHANISM

Walter Merville Austin, Pittsburgh, Pa.

Application November 5, 1932, Serial No. 641,379

17 Claims. (Cl. 213—31)

My invention relates to a draft gear and particularly to a draft gear of the type in which friction members are employed to oppose the force exerted on the draft gear. This invention is an improvement on the draft gear disclosed in my Patent No. 1,559,540, issued on November 3, 1925.

One object of my invention is to provide a frictional draft rigging in which resilient friction members have large frictional surfaces and are deflected or sprung into frictional contact with a large cooperating surface on the inside of the housing of the draft gear.

A further object of my invention is to provide a draft rigging in which the friction members when in the released position, with no external force applied to the rigging, are under an initial load which forces the frictional surfaces together with a force sufficient to provide substantial resistance to movement, as soon as any external force is applied to the draft gear and without any loss of motion to provide the opposing frictional forces.

A further object of my invention is to provide a draft rigging in which the initial force on the friction members, is applied by the main releasing spring through one or more levers to multiply the force applied several times.

A further object of my invention is to provide a draft gear in which the engaging frictional surfaces have such a taper that substantially no change in size of the resilient friction members need be accomplished by relative movement of the friction members with respect to each other in order to provide the necessary frictional force as the load is applied.

A further object of my invention is to provide a draft gear of the above character that shall be economical to manufacture and efficient in its operation.

In practicing my invention, I provide a cylindrical housing having a tapered internal bore in which are disposed two or more resilient friction members which are also tapered. These resilient friction members have engaging helicoidal edges so that their diameter is determined by the force applied on their ends. A cylindrical main yoke is positioned inside the friction members and has an outwardly extending flange which engages the inner end of the inner friction member. The outer end of the main yoke is provided with an inwardly projecting flange and the main releasing spring is disposed within the yoke between the inwardly projecting flange and the bottom of the housing. An auxiliary yoke is positioned within the friction members at their outer end above the main yoke and has an outwardly extending flange engaging the outer end of the outer friction member. The auxiliary yoke is slotted longitudinally and has a steeply tapered conical portion at the inside of its lower end. A wedging member is provided having an outer conical surface engaging the conical surface of the auxiliary yoke so that movement of the wedging member causes expansion of the auxiliary yoke.

A plurality of radially arranged levers have their fulcrums resting on the wedging member. One end of each lever bears against one end of a collar, the other end of which engages the main yoke. The other end of each of the levers engages a transmission member which is connected by a bolt extending through the collar and the main releasing spring to the inner end of the housing. The bolt is screw threaded into the transmission member and is screwed up to such a point that the main releasing spring is compressed, and force is applied to expand the friction members into engagement with the housing to such an extent that the frictional force opposing relative movement of the friction members and the housing is substantial and in amount best suited to the service required of the draft gear. The initial load is applied to the draft gear through an auxiliary spring positioned in the auxiliary yoke with one end engaging the transmission member. Load is applied to the draft gear by compressing the auxiliary spring until its outer end is even with the outer end of the auxiliary yoke. The force is then applied to the outer end of the auxiliary yoke and further movement forces the resilient friction members to move into the housing with a reaction opposing the movement which increases much more rapidly than did the initial reaction.

When a force is applied to two members tending to slide them along each other, the frictional force opposing relative movement of the two members is a maximum at an instant just before movement occurs; and after movement has begun, the opposing frictional force decreases as the velocity of movement increases. Or stated in other terms, the coefficient of static friction is greater than the coefficient of sliding friction, and the coefficient of sliding friction decreases as the velocity of relative movement increases. In order to take advantage of these facts, it is desirable to keep the velocity of relative movement between the friction members as small as possible. To accomplish this, I make the taper of the inside of the housing and of the outside of the friction members just sufficient to permit the friction members to be forced into the housing without any relative movement taking place between the friction members themselves along their helicoidal edges. This is possible even though the inside of the housing and the outside of the friction members are tapered since the elasticity of the material when placed under stress causes the internal diameters of the housing to increase, and causes the external diameters of the friction members to decrease.

If the taper of the inside of the housing and the outside of the friction members is made too small, it will be necessary for the friction members to slide toward each other along their helicoidal edges and to expand circumferentially in order to engage the housing with the necessary force. When this longitudinal sliding together of the friction members takes place, the friction between the edges of the friction members greatly reduces the overall reaction of the draft gear against being compressed.

On the other hand, if the taper of the inside of the housing and the outside of the friction members is made too large, the force exerted by the housing on the friction members will cause them to contract circumferentially and expand or slide apart longitudinally along their helicoidal edges when the friction members are forced into the housing. In this case the frictional force between the helicoidal edges of the friction members is in the direction to maintain a high reaction of the draft gear against being compressed, but it is not so high as it would be if the friction members were just at the point of sliding relative to each other, but did not slide.

It is also desirable to keep the amount of sliding of the friction members relative to each other along their helicoidal edges as small as possible, due to the fact that the unit pressures on the helicoidal edges is much higher than the unit pressures between the friction members and the housing, since the area of contact between the edges is much less than the area of contact between the friction members and the housing. There is consequently a much greater tendency for wear to take place between the helicoidal edges of the friction members, and this tendency is proportional to the amplitude of movement. The amount of wear is, therefore, greatly reduced by making the taper of the housing and the friction members such that there is substantially no relative movement between the friction members.

In a draft gear of the dimensions usually necessary in reilway freight and passenger cars, calculations show that if the inside diameter of the resilient friction members is uniform throughout its length, the taper of the inside surface of the housing and the outside surface of the friction members should be greater at the outer end of the housing than at the inner end. Such a non-uniform taper is difficult if not impossible to make using standard tools. I have found that the same result may be accomplished without running into this difficulty by tapering the inside of the flexible friction members in the direction opposite to the taper of the outside of the friction members and the inside of the housing. That is, the inside diameter of the housing and the outside diameter of the friction members decrease in size from the outer end of the housing to the inner end thereof, but the inside diameter of the friction members increases in size from the outer end of the housing to the inner end thereof. This means that the thickness of the friction members decreases rapidly toward the inner end of the housing. This reduction in thickness of the friction members toward their inner ends causes the compressive stresses to be higher at their inner ends than would otherwise be the case, and also makes the inner end of the friction members less rigid so that their diameter may be reduced a greater amount under stress as the friction members are forced into the tapered housing. In this way I am able to make the ideal taper of the inside surface of the housing and the outside surface of the friction members uniform throughout their lengths.

In the accompanying drawings:

Figure 1 is a view partly in elevation and partly in section through a structure embodying my invention;

Fig. 2 is a view in elevation of an expansible yoke member;

Fig. 3 and Fig. 4 are plan and elevational views respectively of one of the levers used in my invention;

Fig. 5 and Fig. 6 are plan and elevational views respectively of a collar member;

Fig. 7 is a partial view, partly in section and partly in elevation of a modified form of my invention;

Figure 8:
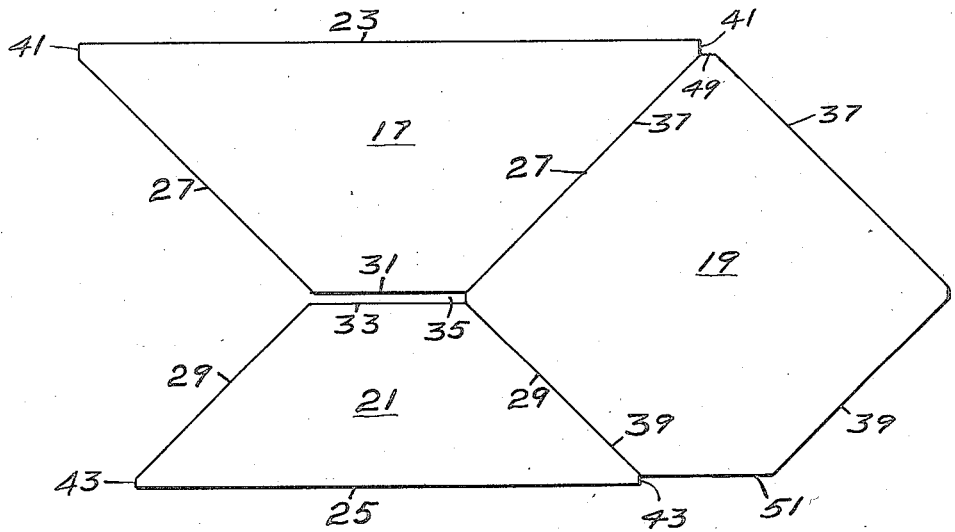
Fig. 8 is a developed view of the friction members showing their shapes.

As shown on the drawings, the draft gear comprises a main housing 11 having a cylindrical interior bore which is open at its outer end and is closed at its lower end by the rectangular flat base 13. The inner surface 15 of the housing 11 is slightly tapered from its open end to its inner end so that its diameter at its inner end is smaller than at its outer end. Positioned within the housing 11 are three flexible resilient friction members 17, 19 and 21 which together form a cylinder having its outer surface in engagement with the inner surface 15 of the housing. In order to better show the shapes of the cylindrical friction members, they are shown rolled out flat in Fig. 8. The top of the cylinder is formed by the upper edge 23 of the upper friction member 17 and the lower end of the cylinder is formed by the lower edge 25 of the lower friction member 21. The side edges 27 of the friction member 17 and the side edges 29 of the friction member 21 are tapered in opposite directions, and are helicoidal since the flexible friction members are cylindrical in form. The lower edge 31 of the upper friction member 17 is slightly separated from the upper edge 33 of the lower friction member 21 by a space 35. The size of the space 35 is determined by the relative positions of the upper and lower friction members 17 and 21, and the intermediate friction member 19 which has helicoidal edges 37 in engagement with the helicoidal edges 27 of the upper friction member and has helicoidal edges 39 in engagement with the helicoidal edges 29 of the lower friction member.

The edges 27 and 29 preferably make substantially the same angle with the longitudinal axis of the friction members, and since the upper friction member 17 is deeper than the lower friction member 21, the upper edge 23 of the upper friction member is longer than the lower edge 25 of the lower friction member, and the upper edge 49 of the intermediate friction member 19 is considerably shorter than its lower edge 51.

These relative proportions are used due to the fact that when the draft gear is compressed, the resilient friction members are under compressive stress both longtudinally and circumferentially. The load on the inner end 25 of the inner friction member 21 is the same as that on the main releasing spring. Considering the three resilient friction members as a friction cylinder, the total longitudinal load in the friction cylinder at any traverse plane is equal to the sum of the load on the main releasing spring and the total frictional load between the transverse plane and the inner end 25 of the inner resilient friction member 21. It is thus seen that when the draft gear is compressed, the load carried by the outer end 23 of the outer resilient friction member 17 is many times greater than that carried by the inner end 25 of the inner friction member 21. For the above reason, it is desirable that the outer end of the outer resilient friction member be as near a complete circle as manufacturing methods will permit. The fact that the helicoidal edges should have as large a pitch as is consistent with positive release, and the further fact that economy in total length is necessary, make it necessary usually to truncate the outer end 33 of the inner resilient friction member 21 and the inner ends 31 and 51 of the two other resilient friction members 17 and 19.

The length of the upper edge 23 of the upper friction member 17 is somewhat less than the circumference of the inner surface 15 of the housing at its upper end so that there is a short longitudinal slot 45 between the adjacent short parallel side edges 41 of the upper friction member. There is also a space 47 between the short parallel side edges 43 of the lower friction member. It is thus seen the cylindrical flexible friction members are expansible circumferentially into frictional engagement with the inner surface 15 of the housing by the application of a force between the ends of the cylinder, due to the wedging action of the helicoidal edges of the intermediate friction member 19 on the helicoidal edges on the upper and lower friction members 17 and 21 as they are moved together.

The outer cylindrical surface 53 of the flexible friction members 17, 19 and 21 is tapered with substantially the same taper as the inner cylindrical surface 15 of the housing 11 so that the outer diameter of the cylinder decreases slightly from its outer end to inner end. The degree of taper is small so that the friction cylinder can just be forced into the housing by taking advantage of the inherent elasticity of the material of the housing and of the friction cylinder, which causes the housing to expand slightly in diameter and causes the cylinder to contract slightly in diameter without substantially any relative movement between the three friction members forming the cylinder. By giving this exact degree of taper to the inner surface of the housing and to the outer surface of the friction cylinder, it is not necessary for the friction cylinder to contract by the friction members 17 and 21 moving apart longitudinally as would be the case if the degree of taper were made too great; or for the friction cylinder to expand, by the friction members 17 and 21 moving together as would be the case if the degree of taper were made too small. This construction has the advantages, previously pointed out, of giving the maximum overall reaction of the draft gear against being compressed, and of reducing to a minimum the amount of wear on the helicoidal engaging edges of the three friction members.

The inner surface 55 of the cylinder formed by the three flexible friction members 17, 19 and 21 is tapered in the direction opposite to the taper of its outer surface 53. That is, while the outer diameter of the cylinder decreases from the top to the lower end, the inner diameter of the cylinder increases from the top to the lower end. This makes the thickness of the cylinder wall decrease from the upper end of the cylinder to the lower end, so that the lower end of the cylinder is more flexible than the upper end, and makes the ideal taper for the outer surface of the cylinder and the inner surface of the housing uniform from end to end, as has been pointed out above. The degree of taper of the outer surface 53 of the cylinder is thus chosen such that the cylinder can be moved into the housing 11 without any relative movement between the three friction members 17, 19 and 21, and the degree of taper of the inner surface 55 is chosen to give the desired decrease in thickness of the cylinder wall.

Figure 9:
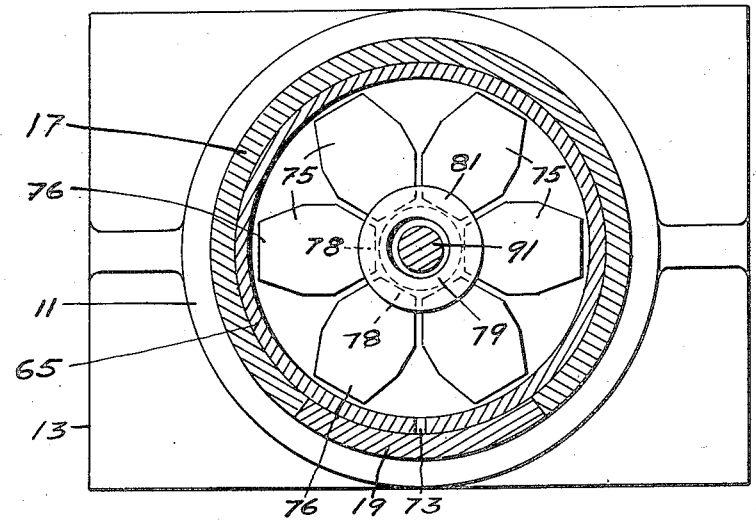
Fig. 9 is a sectional view taken on the line IX—IX of Fig. 1.

Positioned within the lower end of the cylinder formed by the three flexible friction members 17, 19 and 21, is the main yoke 57 which is cylindrical in form and extends into the lower end of the friction cylinder for the major portion of its length. The lower end of the yoke 57 is provided with an outwardly extending flange 59 which engages the lower edge 25 of the friction cylinder, and the upper end of the yoke is provided with an inwardly extending flange 61. A main releasing and biasing spring 63 (shown partly in section and partly in elevation in Fig. 1) extends within the yoke 57 from its upper flange 61 to the base 13 of the housing. An auxiliary yoke 65 is positioned within the upper end of the cylindrical friction members, and has an outwardly extending flange 67 engaging the upper edge 23 of the upper friction member 17. The lower end of the auxiliary yoke 65 extends to a point closely adjacent but slightly spaced from the upper end of the main yoke 57, and is provided with an inwardly extending flange 69 having a beveled edge. An annular wedging member 71 has a beveled outer edge engaging the beveled flange 69. The auxiliary yoke 65 is longitudinally slotted at 73 as shown in Figs. 2 and 9, so that the auxiliary yoke may be expanded circumferentially as the wedging member 71 is forced downwardly against the beveled flange 69. This provides lateral forces for directly expanding the upper flexible friction member 17 into engagement with the housing 11, in addition to the expansion of the three friction members as a whole when a longitudinal force is exerted between the ends of the friction cylinder.

The adjacent inwardly extending flanges of the main and auxiliary yokes are pried together to exert a compressive force on the ends of the cylindrical friction members by means of a plurality of radially arranged levers 75 which are fulcrumed at 77 on the annular wedging member 71. The inner ends 78 of the levers 75 project under and engage the upper flange 81 of a collar 79. The lower flange 83 of the collar 79 extends under the inwardly extending flange 61 of the main yoke so that the application of a force downwardly on the outer ends 76 of the levers 75 pulls the main and auxiliary yokes toward each other so that the outwardly extending flanges 59 and 67 on the yokes exert a longitudinal compressive force on the ends of the friction cylinder to cause it to expand circumferentially. In the particular embodiment of the invention illustrated in the drawings, the fulcrum 77 of each lever 75 is approximately one-third of the length of the lever from the inner end 78. This means that the force exerted to pry the yokes 57 and 65 together is approximately three times the force exerted on the outer end 76 of the lever, since the force is multiplied by the ratio of the length of the lever to the distance from the fulcrum 77 to the end 78 where the work is done.

Force is applied to the outer ends 76 of the levers 75 by means of a round transmission disk 85 having a boss 87 in which a tie bolt 91 is threaded and prevented from turning by a cotter pin 89. The head 93 of the tie bolt 91 is slidable in and normally engages the inner end of a guide housing 95 which is threaded into the base 13 at the closed end of the housing 11. The main releasing and biasing spring 63 exerts a force between the inturned flange 61 of the main yoke 57 and the base 13 of the housing 11. The downward force of the main spring on the base 13 is transmitted through the guide 95 and the tie bolt 91 to exert a downwardly directed force on the outer ends 76 of the levers 75 by means of the disk 85. The main spring 63 is chosen of such dimensions that when the draft gear is assembled, the tie bolt may be screwed into the disk 85 until the spring has been initially compressed a substantial amount. In one design, the main spring is initially compressed one-fourth of the total distance that it may be compressed. Where the force exerted by the spring is proportional to the distance that it has been compressed, the initial biasing force transmitted to the disk 85 is one-fourth the maximum compressive stress of the spring. This force is applied to the outer ends of the levers 75 and is multiplied by the levers three times, so that the longitudinal compressive force applied between the ends of the cylindrical friction members to expand them, prior to the application of any load to the draft gear, is three-fourths of the maximum compressive stress of the main spring. This means that the force initially biasing the flexible friction members into engagement with the housing is as great as the biasing force that would be present in a draft gear, not making use of the tie bolt and multiplying levers, after it has been compressed for three-fourths of its total distance. This construction has the advantage over structures in which a tie bolt is used, but in which it is tightened up only to the point where the main spring has been compressed only a small amount sufficient to take up the slack in the parts, rather than to apply a large initial biasing force so that as soon as any load is applied to the draft gear, movement of the friction members into the housing is opposed by a substantial frictional force and movement is not wasted in first expanding the friction members into heavy frictional engagement with the housing.

An auxiliary spring 97 is positioned in the auxiliary yoke 65 with its lower end against the transmission disk and with its upper end extending beyond the flange 67 on the end of the yoke 65.

The operation of the draft gear of my invention is as follows:

When a force is initially applied between the ends of the draft gear to compress it, the auxiliary spring 97 is first compressed. This auxiliary spring itself takes care of small changes in the load on the draft gear which occur during normal operation of the train, but which do not require the functioning of the complete draft gear. When the force is sufficiently large to compress the auxiliary spring 97 until it is completely within the outer end of the auxiliary yoke 65, the friction cylinder formed by the three resilient friction members 17, 19 and 21 begins to be forced into the tapered interior bore 15 of the housing 11 with a greatly increased resistance to movement. As the head 93 of the tie bolt 91 moves away from the inner end of the guide housing 95, the main releasing spring 63 no longer exerts force through the transmission disk 85 to expand the friction members, but this force has already been previously replaced by the compression of the auxiliary spring 97 against the transmission disk 85. The force exerted by the auxiliary spring 97 is multiplied by the levers 75 in the same way as when the force was exerted by the main releasing spring 63.

As the cylindrical friction members are moved further into the housing, they present a greatly increased resistance to compression of the draft gear due to the taper of the inside surface 15 of the housing 11 and to the taper of the outside surface 53 of the three friction members 17, 19 and 21. This taper is of such degree, as has been previously pointed out, that substantially no relative movement takes place between the three resilient friction members 17, 19 and 21, since the necessary change in size to allow the tapered members to move into each other, is accomplished by the inherent elasticity of the material of the housing and the friction members. The friction members move into the housing until the total energy of the impulse has been expended in work in the draft gear, or until the member through which the load is applied to the draft gear has reached its limit of movement.

When the compressive force on the draft gear has been released, the friction cylinder will probably not be able to be moved as a unit out of the housing by the main spring 63, due to the cylinder having been forced so tightly into the housing. A quick release is obtained, however, due to the fact that the removal of the load has permitted the auxiliary spring 97 to expand so that it no longer exerts so large a force on the transmission disk 85. This allows the annular wedging member 71 to move upwardly and allow the auxiliary yoke 65 to contract to its normal position. This removes the lateral expanding forces on the upper resilient friction member 17 and allows it to contract to its natural smaller size. The downward force on the helicoidal edges of the intermediate friction member 19 is thus removed and it is allowed to contract out of engagement with the inner surface of the housing. In the same way, the lower friction member 21 contracts, removing all frictional opposition to movement of the three friction members out of the housing by the main releasing spring 63.

As soon as the head 93 of the tie bolt hits the end of the guide housing 95, a large force is again applied through the multiplying levers 75 to compress the friction members longitudinally and expand them circumferentially into engagement with the inner surface of the housing with a large force, so as to be ready to initially oppose another compression of the draft gear with a large frictional force. It is thus seen that the draft gear of my invention provides large frictional forces in opposition to the load applied thereto, but at the same time minimizes the possibility of the friction members jamming in the housing, and gives a very quick and positive release.

Another important feature of the invention lies in the fact that length of the friction cylinder is about the same as the total length of the housing thus giving a maximum amount of frictional surface. By the use of the main yoke member, the main spring may extend into the cylindrical friction members so that its length is also the total length of the housing, but does not add to the total overall length of the draft gear.

While I have illustrated a specific modification embodying a number of different new features which closely cooperate to give a most efficient draft gear, it should be understood that some of these features may be used without the others if found desirable. For example, there is shown in Fig. 7, a modification to which the same reference numerals have been applied as to the corresponding parts in the other figures. The tie bolt 91 applies the force from the main spring 63 directly to the auxiliary yoke 65 instead of applying it through multiplying levers and an annular wedging member. The details of the construction of the draft gear of my invention may be variously modified without departing from the spirit and scope of my invention as defined in the appended claims.

I claim as my invention:

1. In a friction shock absorbing mechanism, a pair of relatively movable members having engaging surfaces, means for expanding one of said members to press said engaging surfaces together, means for exerting a force to be transmitted to said expanding means, and means between said force exerting means and said expanding means for causing the magnitude of the force applied to said expanding means to be greater than the magnitude of the force exerted by said means for exerting the force and said means for exerting the force opposing relative movement of said pair of members upon the application of load to the friction shock absorbing mechanism.

2. In a friction shock absorbing mechanism, a pair of relatively movable members having lateral surfaces in frictional engagement, one of said relatively movable members exerting a force against the lateral surface of the second member when a force is applied longitudinally to said first member, means for exerting a force to be applied longitudinally to said first member, and means through which said force is applied for multiplying said force exerted longitudinally on said first member.

3. In a friction shock absorbing mechanism, a housing, friction members expansible into engagement with said housing and movable therein when load is applied to the friction shock absorbing mechanism, said friction members having means for causing expansion thereof, a main releasing spring biasing said friction members out of said housing, said main releasing spring exerting a force to expand said friction members into engagement with said housing prior to the application of any external load to the friction shock absorbing mechanism, and a multiplying device causing the force applied to said means for causing the expansion of the friction members by said main releasing spring to be greater in magnitude than the force exerted by the main releasing spring.

4. In a friction shock absorbing mechanism, a housing, a plurality of resilient friction members having sloping edges engaging each other positioned in said housing, a spring exerting a force to be applied to said friction members prior to the application of any load to the friction shock absorbing mechanism, and a device between said spring and said friction members for increasing the magnitude of the force transmitted from said spring to said resilient friction members.

5. In a friction shock absorbing mechanism, a housing, a device expansible into frictional engagement with said housing, a pair of members for transmitting forces acting on said device in opposite directions to expand it, a lever having a fulcrum on one of said members and having one end engaging the other of said members, and means for applying a force to the other end of said lever.

6. In a friction shock absorbing mechanism, a housing, a device expansible upon the application of a force between the ends thereof to frictionally engage said housing, a pair of members each engaging one end of said expansible device, means for relatively moving said pair of members including a lever having a mechanical advantage greater than one, a spring for applying force to said lever, and means stressing said spring to apply said force prior to the application of any load to said friction shock absorbing mechanism.

7. In a friction shock absorbing mechanism, a housing having a tapered internal surface, a plurality of resilient friction members having sloping edges engaging each other, means for applying a longitudinal force to said resilient friction members to expand them into engagement with said housing, said resilient friction members having their outer surfaces tapered corresponding to the taper of said internal surface of the housing, and having their internal surfaces tapered in a direction opposite to the direction of the taper of their outer surfaces.

8. In a friction shock absorbing mechanism, a cylindrical housing having an internal bore tapered from its outer end toward its inner end, a hollow cylindrical friction device movable in said housing with its outer surface in engagement with the tapered internal bore of the housing, the outer surface of said hollow cylindrical friction device being tapered from its outer end toward its inner end, and the inner surface of said hollow cylindrical friction device being tapered from its inner end toward its outer end.

9. In a friction shock absorbing mechanism, a cylindrical housing having an internal bore tapered from its outer end toward its inner end, a plurality of relatively thin flexible friction members having helicoidal engaging edges, the outer surfaces of said friction members being tapered from their outer ends toward their inner ends and the inner surfaces of said friction members being tapered from their inner ends toward their outer ends, a yoke positioned within said friction members and having its inner end engaging the inner end of said friction members, and a releasing spring positioned between the other end of said yoke and the inner end of said housing and biasing said friction members out of said housing.

10. In a friction shock absorbing mechanism, a housing having tapered surfaces, a plurality of relatively movable friction members having tapered surfaces for frictional engagement with the tapered surfaces of said housing, said plurality of friction members being expansible and contractable upon relative movement of said members and being movable into said housing upon the application of load to the friction shock absorbing mechanism, and the degree of taper of said tapered surfaces of said housing and of said relatively movable friction members being so small that substantially no relative movement takes place between said plurality of friction members as they move into said housing.

11. In a friction shock absorbing mechanism, a housing having an opening tapered toward the inner end thereof, a plurality of friction members having tapered surfaces for engaging said housing, said plurality of friction members being relatively movable and having sloping edges engaging each other, means exerting a force on said relatively movable members for expanding them into engagement with said housing prior to the application of load to the friction shock absorbing mechanism, said plurality of friction members being movable into said housing upon the application of load to the friction shock absorbing mechanism, and the degree of taper of said engaging surfaces of the housing and of the friction members being so small that substantially no relative movement takes place between said friction members as they move into said housing.

12. In a friction shock absorbing mechanism, a housing having an opening tapered toward the inner end thereof, a plurality of flexible friction members having helicoidal edges engaging each other positioned in said housing, a spring positioned in said flexible friction members, means stressing said spring prior to the application of load to the friction shock absorbing mechanism and applying the force exerted by said spring to said friction members for expanding them into engagement with the housing, said flexible friction members being tapered in the same direction as said housing and being movable into said housing upon the application of load to the friction shock absorbing mechanism and the degree of taper of said housing being so small that substantially no relative movement takes place between said helicoidal edges as said friction members move into said housing.

13. In a friction shock absorbing mechanism, a housing, a plurality of friction members having sloping edges engaging each other and means for applying a force longitudinally to said friction members for expanding them into engagement with said housing by moving them relative to each other along said sloping edges, and an expansible member for applying a force laterally to at least one of said friction members for moving it into engagement with said housing.

14. In a friction shock absorbing mechanism, a housing having a tapered opening therein, a plurality of flexible friction members having helicoidal edges engaging each other positioned in said housing, a main releasing spring opposing movement of said friction members into said housing, said main releasing spring being stressed prior to the application of load to the friction shock absorbing mechanism and applying its force to tend to move said flexible friction members relative to each other along said helicoidal edges, and a cylindrical member positioned within said flexible friction members and having a tapered portion, and a wedging member engaging said tapered portion and biased to expand said cylindrical member to apply lateral forces to at least one of said flexible friction members for expanding it into engagement with said housing.

15. In a friction shock absorbing mechanism, inner and outer friction members, one of which is resilient, said friction members having the inner surface of one member in frictional engagement with the outer surface of the other member and the engaging surfaces of said members being tapered with greater than zero taper in the same direction, said friction members being relatively movable upon the application of load to the friction shock absorbing mechanism in such direction as to increase the frictional resistance to relative movement between said members, and the taper of the engaging surfaces of said friction members being so small that they each retain their lateral dimensions during said movement except for the change in lateral dimensions permitted by the inherent resiliency of the material of the members.

16. In a friction shock absorbing mechanism, a pair of friction means relatively movable longitudinally one within the other upon the application of load to the friction shock absorbing mechanism, one of said friction means being variable in its lateral dimension into firmer engagement with the other friction means upon the application of force longitudinally thereto, and means having portions movable laterally for applying an additional force laterally to one of said friction means to force it into firmer engagement with the other friction means.

17. In a friction shock absorbing mechanism, a housing, means in frictional engagement with the surface of said housing, means for wedging said means into engagement with the housing, spring means opposing relative movement between said housing and said means in frictional engagement therewith, said spring means exerting a force to be transmitted to said wedging means, and a force multiplying device between said spring means and said wedging means for increasing the magnitude of the force applied to said wedging means.

WALTER MERVILLE AUSTIN.